D. MIOLANS.
COMBINED CLUTCH AND BRAKE.
APPLICATION FILED DEC. 22, 1908.
975,629.
Patented Nov. 15, 1910.
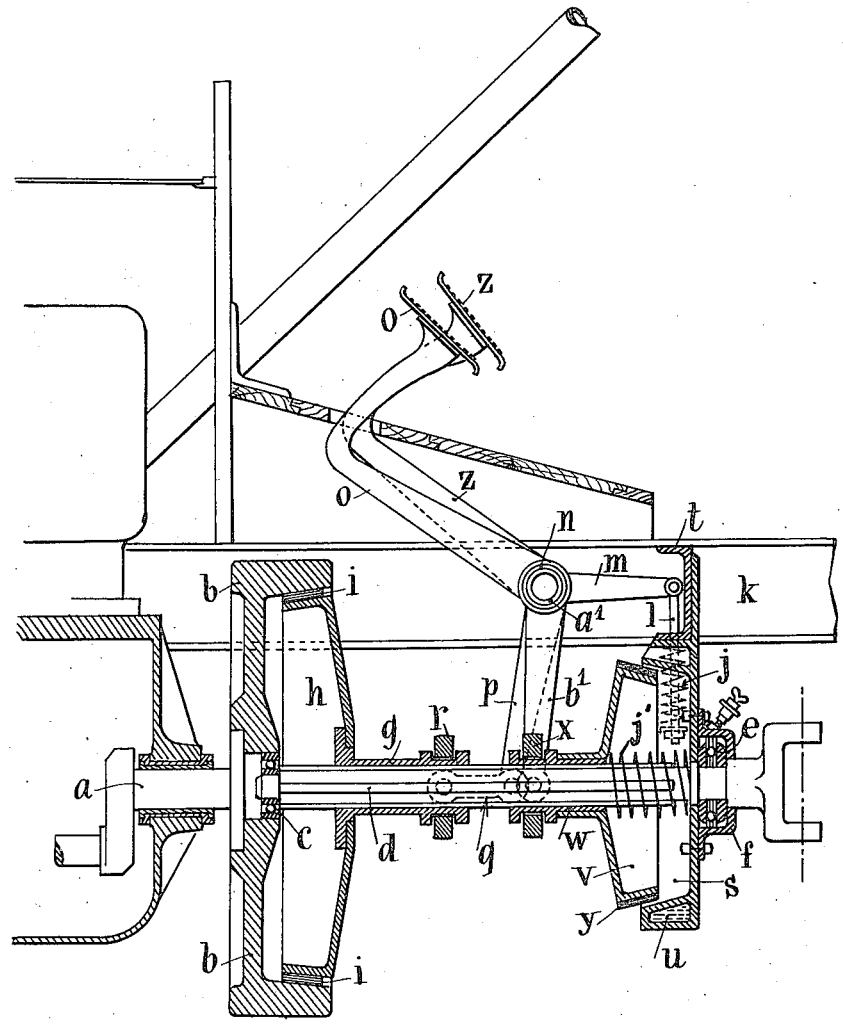
WITNESSES:
INVENTOR,
DOMINIQUE MIOLANS,
Attorney.

UNITED STATES PATENT OFFICE.

DOMINIQUE MIOLANS, OF PARIS, FRANCE.

COMBINED CLUTCH AND BRAKE.

975,629.  Specification of Letters Patent.  Patented Nov. 15, 1910.

Application filed December 22, 1908. Serial No. 468,787.

*To all whom it may concern:*

Be it known that I, DOMINIQUE MIOLANS, a citizen of the Republic of France, and resident of 108 Rue de la Boétie, Paris, Seine, France, have invented an Improvement in a Combined Clutch and Brake, of which the following is a specification.

This invention has for object a new arrangement of clutch and brake combined, applicable to engines and driven machinery of all kinds, but more especially to automobile carriages such as represented in the accompanying drawing and which is given as an example.

Upon the driving shaft $a$, is mounted a fly wheel $b$ having a conical hollow and a central bearing $c$ in which one end of the driven shaft $d$ is carried, the other end of said shaft $d$ is supported by the plummer block $e$ carried upon the block $f$. The shaft $d$, by means of any suitable mechanical arrangement, insures rectilinear engagement of the cones which slide upon it.

A sleeve $g$ carries a clutch cone $h$ and, upon this cone, is fixed a surrounding rim of elastic material and slightly beveled to permit of the movement of the clutch; upon this rim are arranged circular pads, or in preference a covering $i$, to assure adherence by friction to the fly wheel $b$.

The frictional cone or clutch $h$, is constantly pushed in the opening of the fly wheel $b$, in which it engages itself by the action of a spring $j$, working under compression and which is placed under the frame $k$ where it takes a bearing and pulls upon the rod $l$, attached to the lever $m$, on the tube $n$, which carries the pedal $o$, and the lever $p$, this lever $p$, by means of the two connecting rods $q$, acts upon a socket provided with projections $r$, engaged in the neck of the sleeve $g$.

The arrangement of the brake mechanism is as follows: A brake block or cap $s$ is fixed upon the cross frame of the frame or chassis $k$. This block is hollow, its rim has a jacket $u$, in which is passed a current of water which prevents overheating when the brake is put on. It allows also space for the spring $j'$, which brings back the brake cone $v$, to its inactive position.

The brake cone $v$, acts in the same manner as that of the clutch. It is mounted upon a sleeve $w$, having a throat in which a socket with projections rests; this cone carries upon periphery a frictional collar $y$.

The brake is operated by a pedal $z$ (similar to the pedal $o$) mounted upon the inner tube $a'$ upon which is fixed the lever $b'$ operating the socket $x$.

The operation of the clutch and the brake is as follows: The clutch is constantly engaged through the action of the spring $j$, which continually presses the cone $h$ in contact with the wheel $b$. The disengagement is obtained by pressing the pedal $o$. The release of the brake is effected by the spring $j'$ aided by the natural action of the shaft when pressure from the pedal $z$ ceases to act upon the cone $v$.

Claim:

In a clutch and brake mechanism, a frame, a brake block fastened to the said frame, a driving shaft, a fly-wheel mounted on said driving shaft and provided at its center with a shaft bearing, a driven shaft mounted at one end in said fly-wheel bearing, a bearing for the other end of the driven shaft fastened to the brake-block, longitudinally displaceable clutch and brake disks carried by the driven shaft, springs holding the clutch members normally engaged and the brake members normally disengaged, in combination with separately operated levers controlling the clutch and brake springs, substantially as set forth.

In testimony whereof I affix my signature in presence of two witnesses.

DOMINIQUE MIOLANS.

Witnesses:
VICTOR MATRAY,
H. C. COXE.